US009536099B2

(12) United States Patent
Iwadate (10) Patent No.: US 9,536,099 B2
(45) Date of Patent: Jan. 3, 2017

(54) INFORMATION PROCESSING APPARATUS AND METHOD OF SETTING SECURITY THEREOF

(75) Inventor: Masahiro Iwadate, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 12/899,066

(22) Filed: Oct. 6, 2010

(65) Prior Publication Data
US 2011/0119731 A1  May 19, 2011

(30) Foreign Application Priority Data

Nov. 18, 2009 (JP) ................................. 2009-263346
Dec. 11, 2009 (JP) ................................. 2009-282225

(51) Int. Cl.
*G06F 21/60* (2013.01)
*G06F 21/10* (2013.01)
*H04L 29/06* (2006.01)

(52) U.S. Cl.
CPC ............. *G06F 21/604* (2013.01); *G06F 21/10* (2013.01); *H04L 63/20* (2013.01)

(58) Field of Classification Search
CPC ......... G06F 21/604; G06F 21/10; H04L 63/20
USPC ................. 726/1, 3, 4, 5, 7, 22, 25
See application file for complete search history.

(56) References Cited

U.S. PATENT DOCUMENTS

| | | | | |
|---|---|---|---|---|
| 6,310,860 | B1 * | 10/2001 | Sheu et al. | 370/252 |
| 6,622,220 | B2 * | 9/2003 | Yoshida et al. | 711/152 |
| 7,194,426 | B1 * | 3/2007 | Box | 705/26.1 |
| 7,437,763 | B2 * | 10/2008 | Guo | 726/25 |
| 7,761,923 | B2 * | 7/2010 | Khuti et al. | 726/27 |
| 8,170,020 | B2 * | 5/2012 | Oliver et al. | 370/392 |
| 8,544,078 | B2 * | 9/2013 | Lee | 726/11 |
| 2001/0044840 | A1 * | 11/2001 | Carleton | H04L 41/0663 709/223 |

(Continued)

FOREIGN PATENT DOCUMENTS

| | | | |
|---|---|---|---|
| JP | 2006050407 A | 2/2006 | |
| JP | 2007-128234 | 5/2007 | |
| WO | WO 2004/100011 | * 11/2004 | ......... H04L 12/2697 |

OTHER PUBLICATIONS

SyncThru Web Admin Service Administrator Manual. 2007. p. 1-39.*

(Continued)

*Primary Examiner* — Kari Schmidt
(74) *Attorney, Agent, or Firm* — Fitzpatrick, Cella, Harper & Scinto (57) ABSTRACT

An information processing apparatus includes an accepting unit that accepts from a user a command relating to security; a setting unit that makes a setting relating to security of the information processing apparatus based upon the command from the user accepted by the accepting unit; a recording unit that performs the following operation in a case where the accepting unit has accepted a command for changing a security-related setting that has already been made by the setting unit: before the setting unit changes the security-related setting, the recording unit records an event, among events that occur in the information processing apparatus, the content of which will be different between a case where the security-related setting is changed and a case where the security-related setting is not changed; and a notification unit that notifies the user based upon the event that has been recorded by the recording unit.

27 Claims, 9 Drawing Sheets

(56) References Cited

U.S. PATENT DOCUMENTS

| | | | |
|---|---|---|---|
| 2002/0095591 A1* | 7/2002 | Daniell et al. ................ 713/200 |
| 2002/0144156 A1* | 10/2002 | Copeland, III ....... H04L 43/026 |
| | | 726/22 |
| 2003/0212779 A1* | 11/2003 | Boyter ................ H04L 12/2697 |
| | | 709/223 |
| 2004/0015728 A1* | 1/2004 | Cole .................... G02B 5/3083 |
| | | 726/23 |
| 2004/0250107 A1* | 12/2004 | Guo ............................. 713/200 |
| 2005/0289645 A1* | 12/2005 | Hori ................................. 726/7 |
| 2006/0209338 A1* | 9/2006 | Dohi et al. ................... 358/1.15 |
| 2007/0094711 A1* | 4/2007 | Corley et al. ..................... 726/3 |
| 2007/0177523 A1* | 8/2007 | Nagami et al. .............. 370/252 |
| 2008/0066167 A1* | 3/2008 | Andri .............................. 726/5 |
| 2008/0235771 A1* | 9/2008 | Corley et al. ..................... 726/4 |
| 2009/0043875 A1* | 2/2009 | Tajima .......................... 709/223 |
| 2009/0165084 A1* | 6/2009 | Saito ................................ 726/1 |
| 2009/0165132 A1* | 6/2009 | Jain et al. ....................... 726/22 |
| 2009/0282193 A1* | 11/2009 | Corona .............. H04N 1/00965 |
| | | 711/115 |
| 2011/0162036 A1* | 6/2011 | Heo ................................. 726/1 |
| 2011/0191817 A1* | 8/2011 | Oh et al. .......................... 726/1 |

OTHER PUBLICATIONS

Mukherjee, Biswanath, L. Todd Heberlein, and Karl N. Levitt. "Network intrusion detection." Network, IEEE 8.3 (1994): 26-41.*

Mills, David L. "An overview of the distributed computer network." Proceedings of the Jun. 7-10, 1976, national computer conference and exposition. ACM, (1976): 523-531.*

Foresti, Stefano, et al. "Visual correlation of network alerts." IEEE Computer Graphics and Applications 26.2 (2006): 48-59.*

Asrigo, Kurniadi, Lionel Litty, and David Lie. "Using VMM-based sensors to monitor honeypots." Proceedings of the 2nd international conference on Virtual execution environments. ACM, 2006.*

* cited by examiner

| PORT NO. | PRESENT SETTING VALUE | SECURITY LEVEL | | |
|---|---|---|---|---|
| | | LEVEL 1 | LEVEL 2 | LEVEL 3 |
| 501 | ON | ON | OFF | OFF |
| 502 | ON | ON | ON | OFF |
| 503 | ON | ON | ON | ON |

| ITEM | DIFFERENCE INFORMATION |
|---|---|
| SECURITY LEVEL | 1 → 2 |
| PORT NO. 501 | ON → OFF |

| PORT NO. | DIFFERENCE INFORMATION | ACCESSING HOST INFORMATION |
|---|---|---|
| 501 | ON → OFF | 192.11.2.103 |
| 501 | ON → OFF | 192.11.2.127 |

INFORMATION PROCESSING APPARATUS AND METHOD OF SETTING SECURITY THEREOF

BACKGROUND OF THE INVENTION

Field of the Invention

The present invention relates to an information processing apparatus that enables a user to select one security level from among a plurality thereof, and to a method of setting the security of this information processing apparatus.

Description of the Related Art

In an information processing apparatus [incorporated, for example, in an MFP (multifunction peripheral) or the like], there is a technique whereby various setting items relating to security are provided for the sake of various security measures such as the prevention of leaks of information and unauthorized access from the outside, and operation is changed over in accordance with the particular setting. Further, there is a technique in which a plurality of security-related setting items are capable of being set collectively [for example, see the specification of Japanese Patent Laid-Open No. 2007-128234 (Document 1)].

However, security-related setting items include items for which it is difficult to judge what the effect will be if a setting is changed. For example, the effect of a network board ON/OFF setting or the like cannot be determined unless the status of use of each board is ascertained in advance. Further, in an apparatus in which it is possible to set a plurality of security setting items collectively merely by setting the security level, there is the possibility that settings will be made collectively without checking the contents of individual settings carefully. This can lead to unexpected situations, such as an in-use host or host application become usable after a setting is changed.

SUMMARY OF THE INVENTION

The present invention has been devised in view of the foregoing circumstances and provides an information processing apparatus, and a method of setting the security thereof, in which it is possible for a user to select whether or not to actually change a security setting after first recognizing what the effects of the change will be.

According to one aspect of the present invention, there is provided an information processing apparatus comprising: an accepting unit configured to accept from a user a command relating to security; a setting unit configured to make a setting relating to security of the information processing apparatus based upon the command from the user accepted by the accepting unit; a recording unit configured to perform the following operation in a case where the accepting unit has accepted a command for changing a security-related setting that has already been made by the setting unit: before the setting unit changes the security-related setting, the recording unit records an event, among events that occur in the information processing apparatus, the content of which will be different between a case where the security-related setting is changed and a case where the security-related setting is not changed; and a notification unit configured to notify the user based upon the event that has been recorded by the recording unit.

According to another aspect of the present invention, there is provided a method of setting security of an information processing apparatus, comprising: an accepting step of accepting from a user a command relating to security; a setting step of making a setting relating to security of the information processing apparatus based upon the command from the user accepted by the accepting step; a recording step of performing the following operation in a case where a command for changing a security-related setting that has already been made at the setting unit has been accepted at the accepting step: before the security-related setting is changed at the setting step, recording an event, among events that occur in the information processing apparatus, the content of which will be different between a case where the security-related setting is changed and a case where the security-related setting is not changed; and a notification step of notifying the user based upon the event that has been recorded at the recording step.

In accordance with the present invention, whether or not a change in a security setting is actually to be made can be selected by a user upon recognizing beforehand the effects that will be brought about owing to the change in security setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, embodiments of the present invention will be described in detail with reference to the drawings. It should be understood that the embodiments given below are not intended to limit the scope of the claims of the present invention, and that all combinations of the features described in the embodiments are not necessarily essential to the solving means of the present invention.

[Overall Configuration of Information Processing System (FIG. 1)]

Figure 1:
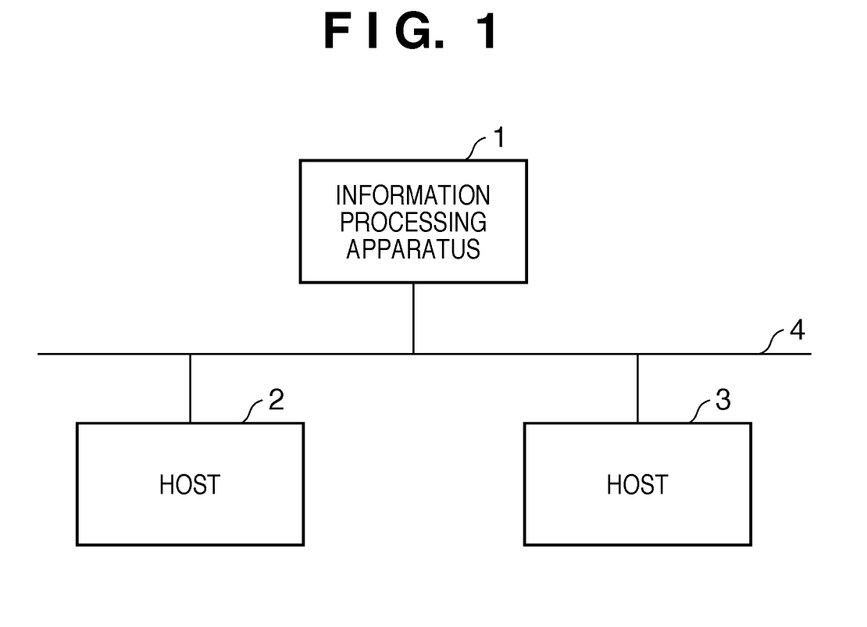
FIG. 1 is a diagram illustrating an information processing system according to an embodiment of the present invention.

As illustrated in FIG. 1, the information processing system includes an information processing apparatus 1 (an MFP or the like, by way of example) connected to a network 4, and hosts 2, 3 (personal computers, for example) connected to the network 4. The information processing apparatus 1 sends and receives data to and from the hosts 2, 3 via the network 4 and executes various processing (image formation processing, by way of example) based upon the results. It should be noted that the information processing apparatus 1 need not necessarily have the overall configuration of an MFP and may function as a control apparatus incorporated in an MFP.

[Hardware Configuration of Information Processing Apparatus 1 (FIG. 2)]

Figure 2:
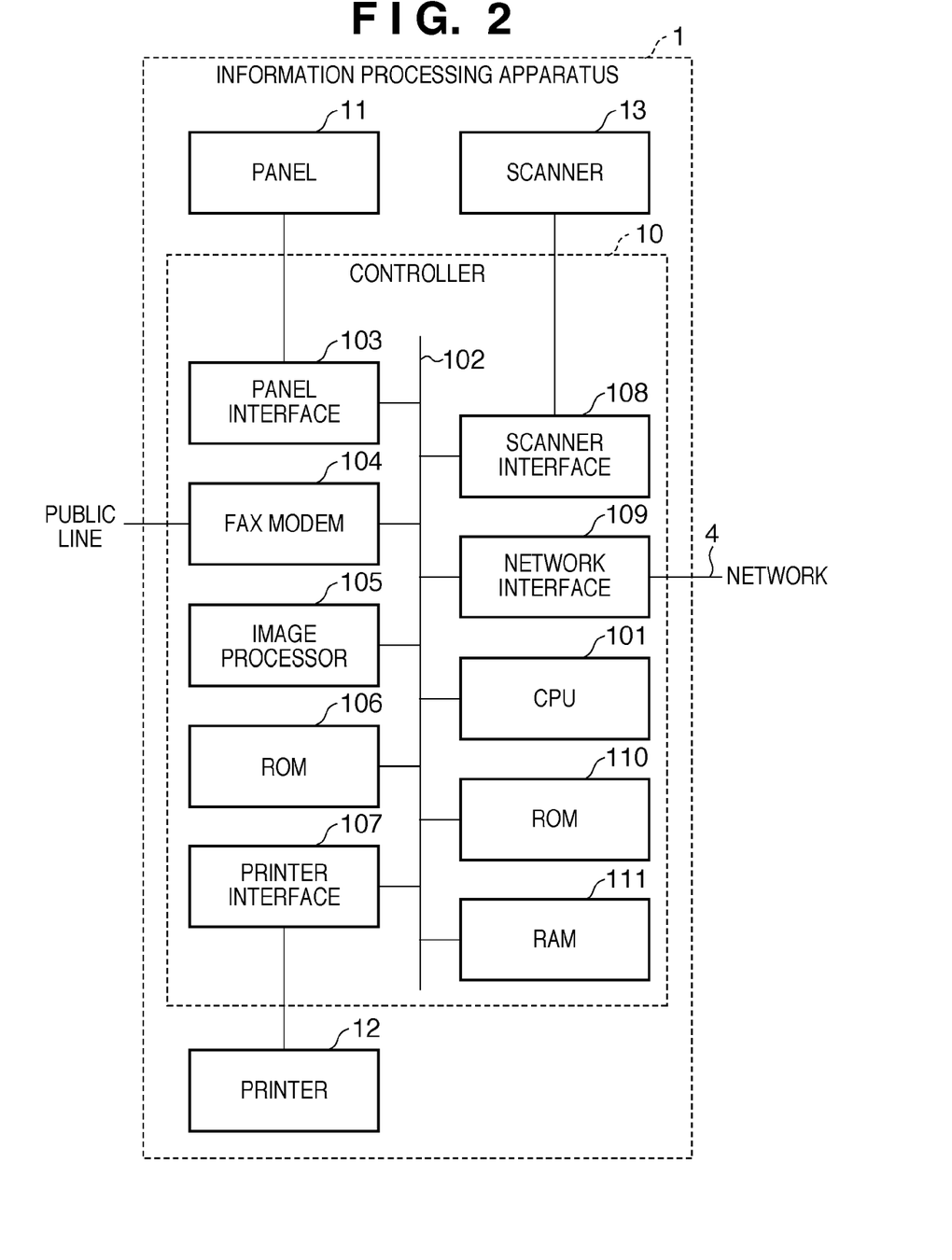
FIG. 2 is a diagram illustrating the hardware configuration of an information processing apparatus 1.

The information processing apparatus 1 includes a controller 10 for controlling the overall apparatus; a scanner 13 for reading a document image; a printer 12 for printing; and a panel (presentation means) 11 for accepting a command input from a user and providing a display output.

The controller 10 has a panel interface 103, a fax modem 104, an image processor 105, a hard-disk drive (HDD) 106, a printer interface 107, a scanner interface 108, a network interface 109, a CPU 101, a ROM 110 and a RAM 111.

The panel interface 103 is connected to the panel 111, sends the CPU 101 a user command that has been input from the panel 11, receives commands from the CPU 101 and outputs screen information to the panel 111.

The fax modem 104 performs fax transmission and reception with another facsimile machine connected to a public line. The scanner interface 108 is connected to the scanner 13 and stores image data, which has been read by the scanner 13, in the hard-disk drive 106.

The printer interface 107 is connected to the printer 12 and image data that has been stored in the hard-disk drive 106 is output to the printer 12. The network interface 109 sends and receives data to and from other devices connected to the network 4.

The hard-disk drive 106 stores system software and image data, as well as a security settings storage section 33 and log storage section 34. When an image is input and output, the image processor 105 subjects this image to various image processing based upon a command from the CPU 101.

The CPU 101 controls the various units in the controller 10 in accordance with the system software stored in the hard-disk drive 106. The ROM 110 is constituted by a booting ROM and stores the system booting program. The RAM 111, which is a system working memory for allowing the CPU 101 to operate, also is an image memory for storing image data temporarily.

[Software Configuration of Information Processing Apparatus 1 (Upper Half of FIG. 3)]

Figure 3:
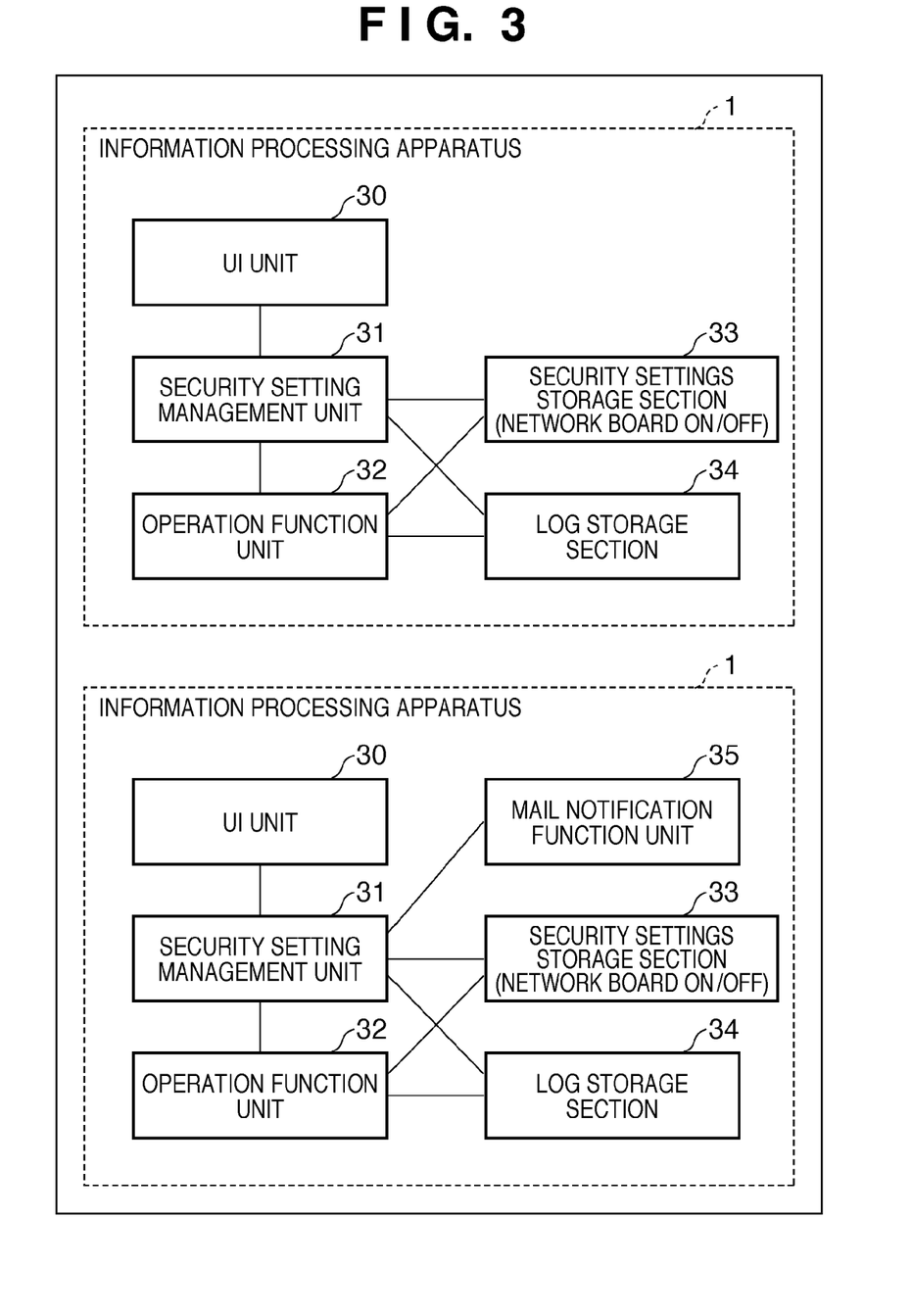
FIG. 3 is a diagram illustrating the software configuration of an information processing apparatus 1.

The information processing apparatus 1 includes a user interface unit 30 (referred to as a "UI unit"), a security setting management unit 31, the operation function unit 32 (network function unit), the security settings storage section 33 and the log storage section 34.

The UI unit 30 accepts a request from a user via the panel 11 and displays an operation screen on the panel 11. The security settings storage section 33 stores various settings relating to security. The operation function unit 32 is a prescribed function unit that operates based upon security settings held in the security settings storage section 33. In this embodiment, the operation function unit 32 functions as a network function unit for communicating with other devices (hosts 2 and 3) connected to the network 4.

An event that occurs in a case where the operation function unit 32 has operated in a preliminary check mode (a second mode) (described below) is held in the form of a log in the log storage section 34. The preliminary check mode is an operation mode in which it is possible to check beforehand what the effect will be if the apparatus is operated using a setting after it has been changed. On the other hand, a mode in which a setting change is reflected immediately without a preliminary check is the normal mode (first mode). The security setting management unit 31 manages the overall security setting operation by sending and receiving information to and from the UI unit 30 and operation function unit 32.

Figure 4:
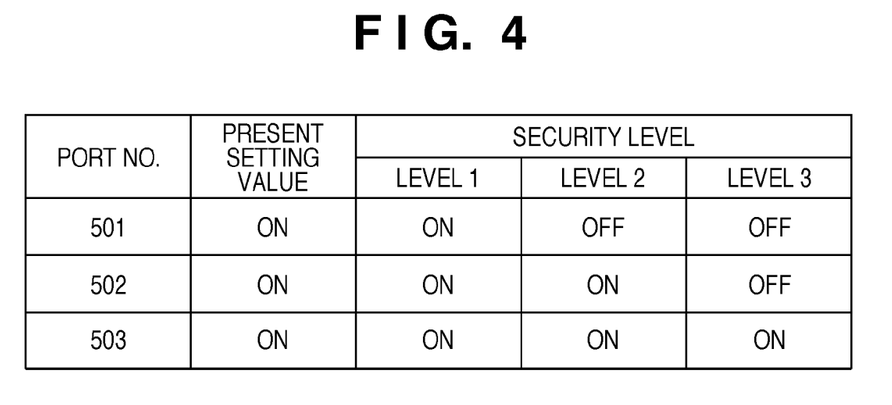
FIG. 4 is a diagram useful in describing an example of setting values held by a security settings storage section 33.

The security settings storage section 33 stores restriction information conforming to a plurality of security levels. This information is stored in advance for every address for which access is conceivable. For example, for each of network ports 501 to 503, as shown in FIG. 4, the security settings storage section 33 stores the present setting (ON: open state/OFF: closed state) of the network port, and default values corresponding to the plurality of security levels 1 to 3.

It should be noted that the processing of the UI unit 30, security setting management unit 31 and operation function unit 32 is executed by the CPU 101 based upon system software that has been stored on the hard-disk drive 106. Further, the security settings storage section 33 and log storage section 34 are contained in the hard-disk drive 106.

[Processing by Information Processing Apparatus 1]

[Overall Processing (FIG. 5)]

Figure 5:
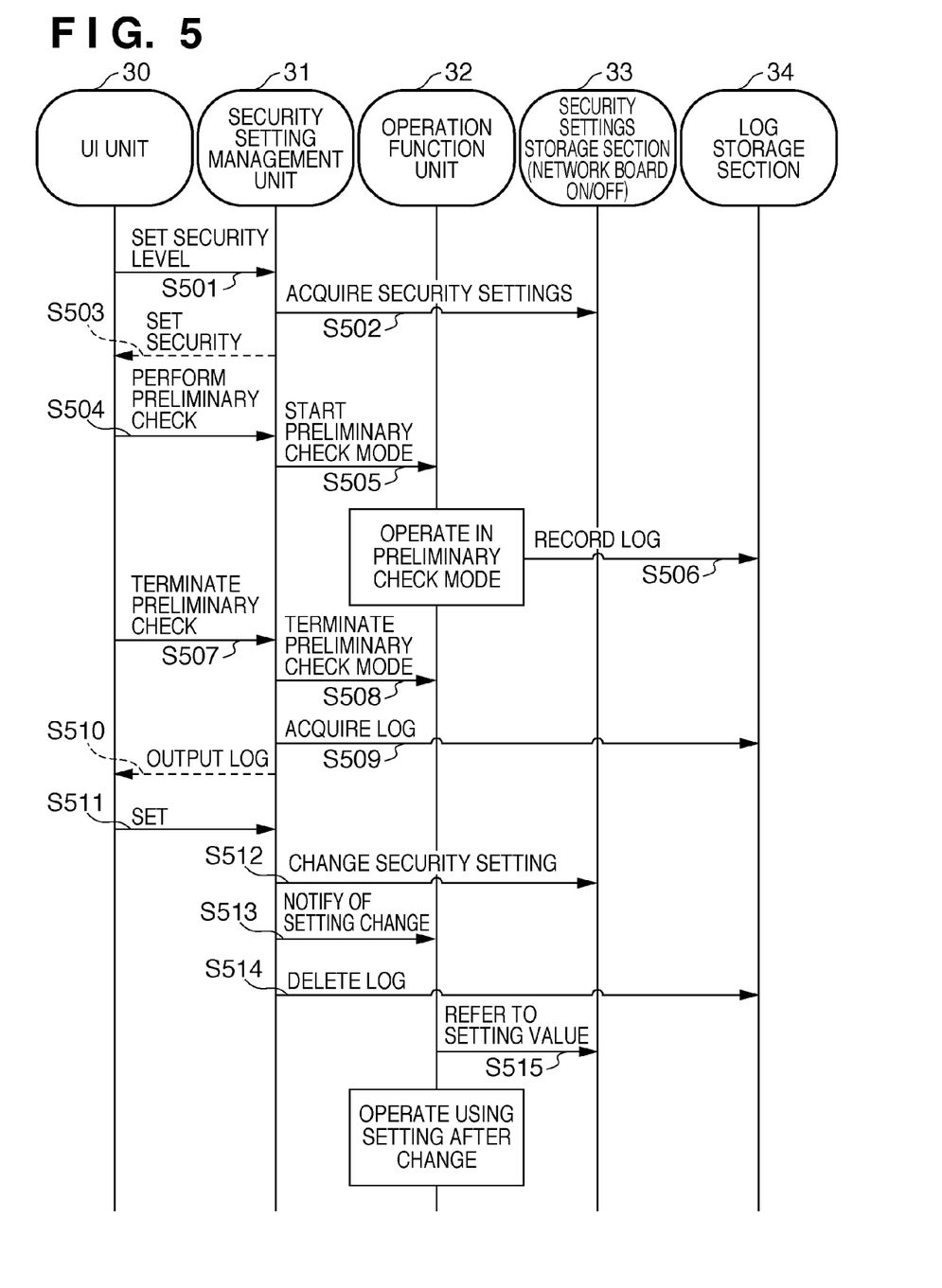
FIG. 5 is a diagram illustrating processing executed by the information processing apparatus 1.

The information processing apparatus 1 executes the processing below using the various function units at the time of the security setting operation. First, the UI unit 30 notifies the security setting management unit 31 of the start of the security level setting operation (S501). The security setting management unit 31 acquires the setting values held by the security settings storage section 33 (S502) and transmits the acquired setting values to the UI unit 30 (S503).

Figure 6:
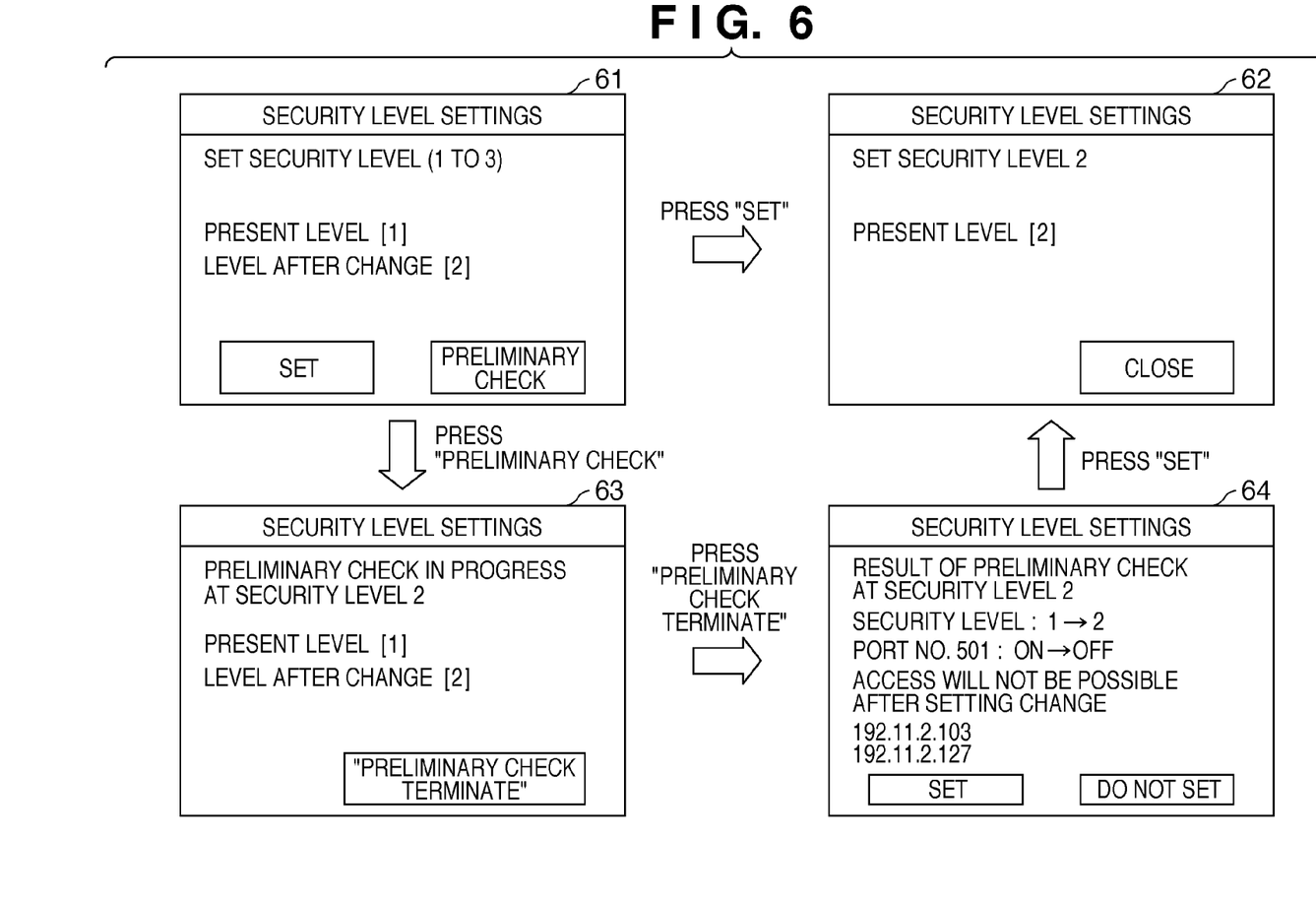
FIG. 6 is a diagram illustrating an example of transitions of an operating screen at the time of a security setting operation.

The UI unit 30 displays an initial screen 61 (see FIG. 6) of security settings on the panel 11. If the user presses a "PRELIMINARY CHECK" button on the initial screen 61, the UI unit 30 transmits a signal indicative of this fact to the security setting management unit 31 (S504). The security setting management unit 31 notifies the operation function unit 32 of the start of the preliminary check mode (S505).

The operation function unit 32 starts operating in the preliminary check mode and, if a prescribed event occurs during this time, records the nature of the event as a log entry in the log storage section 34 (S506). If the user presses a "PRELIMINARY CHECK TERMINATE" button on a screen 63 (see FIG. 6) displayed while the preliminary check mode is in progress, the UI unit 30 transmits a signal indicative of this fact to the security setting management unit 31 (S507). The security setting management unit 31 notifies the operation function unit 32 of termination of the preliminary check mode (S508). The operation function unit 32 terminates operation in the preliminary check mode and waits for the next command.

The security setting management unit 31 acquires the log held by the log storage section 34 (S509) and outputs the log to the UI unit 30 (S510). The UI unit 30 causes the panel 11 to display a screen 64 of the result of the preliminary check performed in the preliminary check mode.

If the user presses a "SET" button on the screen 64 of the result of the preliminary check, the UI unit 30 transmits a signal indicative of this fact to the security setting management unit 31 (S511). The security setting management unit 31 changes the setting value held by the security settings storage section 33 (S512) and notifies the operation function unit 32 of the fact that the setting has been changed (S513).

Finally, the security setting management unit 31 deletes the log held by the log storage section (S514) and terminates the security setting operation. The operation function unit 32 refers to the changed setting value held by the security settings storage section 33 (S515) and starts operation using the changed setting.

[Details of Processing by Security Setting Management Unit 31 (FIG. 7)]

Figure 7:
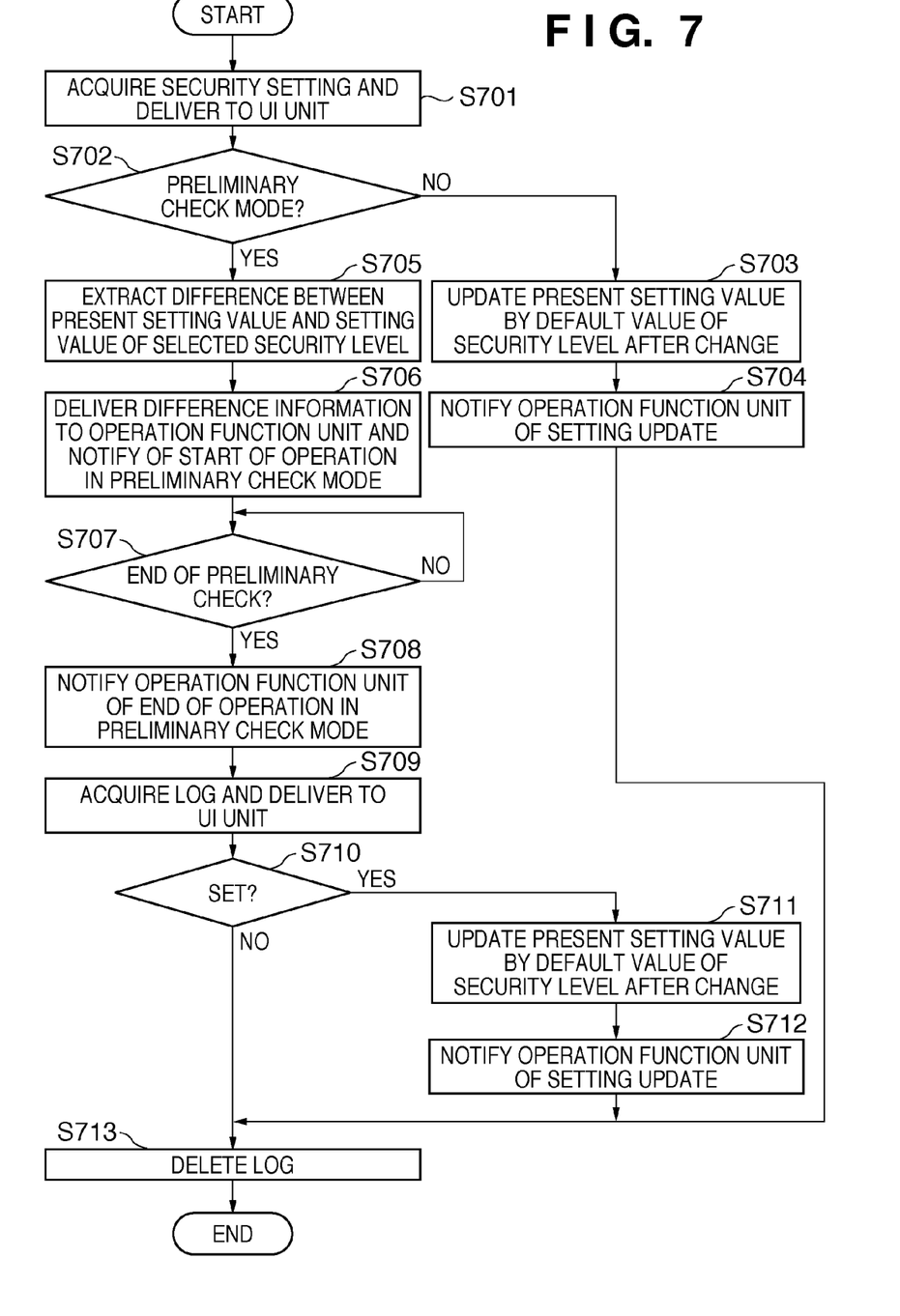
FIG. 7 is a diagram illustrating the details of processing executed by a security setting management unit 31.

Upon receiving the signal indicating start of security level setting processing sent from the UI unit 30 (S501), the security setting management unit 31 starts executing the following processing: First, the security setting management unit 31 acquires the security setting value from the security settings storage section 33, transmits the acquired setting value to the UI unit 30 (S701, S503) and waits for notification from the UI unit 30.

Upon receiving notification from the UI unit 30, the security setting management unit 31 determines whether this notification indicates the preliminary check mode (S702). If the notification from the UI unit 30 indicates the normal mode and not the preliminary check mode, the security setting management unit 31 updates "PRESENT SETTING VALUE" of each item held by the security settings storage section 33 to the default value of the changed security level (S703). Next, the security setting management unit 31 notifies the operation function unit 32 of the fact that the setting has been changed (S704) and the process advances to S713.

Figure 10:
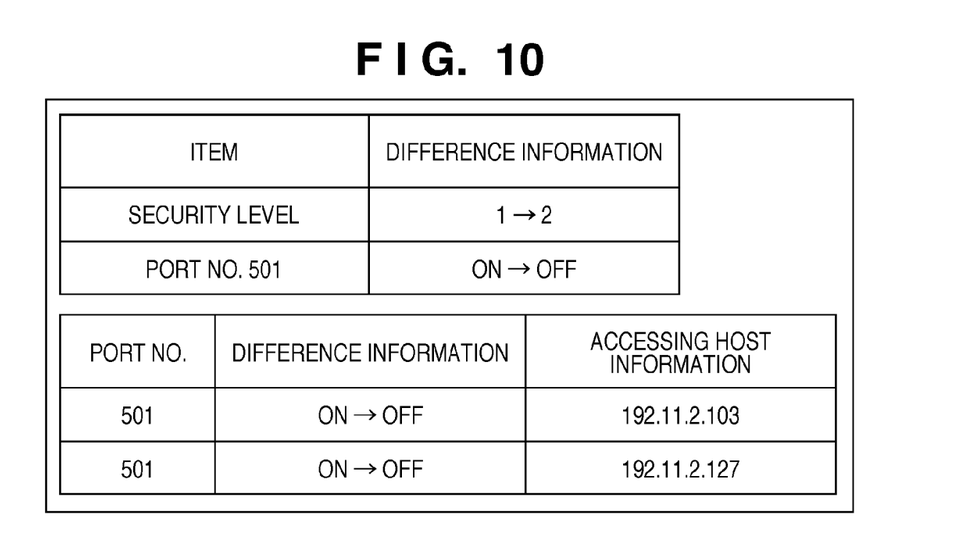
FIG. 10 is a diagram illustrating examples of differential information and a log.

On the other hand, in a case where the notification from the UI unit 30 indicates the preliminary check mode, the security setting management unit 31 extracts difference information between the "PRESENT SETTING VALUE" held by the security settings storage section 33 and the default value of the changed security level (S705). For example, assume a case where the security settings storage section 33 is holding set values of security level of the kind shown in FIG. 4 as "PRESENT SETTING VALUE". In this case, if the security level after the change is designated as "2", then difference information of the kind shown in the upper half of FIG. 10 is extracted by referring to the address (Port No. 501) actually accessed and restriction information (ON or OFF) corresponding to the changed security level "2".

In this embodiment, an example is assumed in which each setting item is changed in operative association with a change in security level. However, in a case where each setting item is changed individually as well, difference information can be extracted in similar fashion and the desired processing executed.

The security setting management unit 31 transmits the difference information to the operation function unit 32 and gives notification of the fact that the preliminary check mode has started (S706, S505). The security setting management unit 31 determines whether it has received from the UI unit 30 notification of the fact that the preliminary check mode has ended (S707). If notification has not been received, the security setting management unit 31 continues to wait. If notification has been received (S507), then the security setting management unit 31 notifies the operation function unit 32 of the fact that the preliminary check mode has ended (S708, S508).

Next, the security setting management unit 31 acquires the log held by the log storage section 34, outputs the log to the UI unit 30 (S709, S510) and waits for a command from the UI unit 30. If a command from the UI unit 30 is received, then the security setting management unit 31 determines whether this command indicates the fact that a setting is to be made (S710). That is, it is determined whether the user has pressed the "SET" button based upon the information displayed on the screen 64 (See FIG. 6) of the result of the preliminary check.

If the notification indicates that a setting is to be made, the security setting management unit 31 updates the setting value held by the security settings storage section 33 (S711, S512) and notifies the operation function unit 32 of the fact that setting has been changed (S712, S513) in a manner similar to that at steps S703 and S704. Finally, the security setting management unit 31 deletes the log held by the log storage section 34 (S713, S514), thereby ending one series of processing steps.

[Details of Processing by Operation Function Unit 32 (FIG. 8)]

Figure 8:
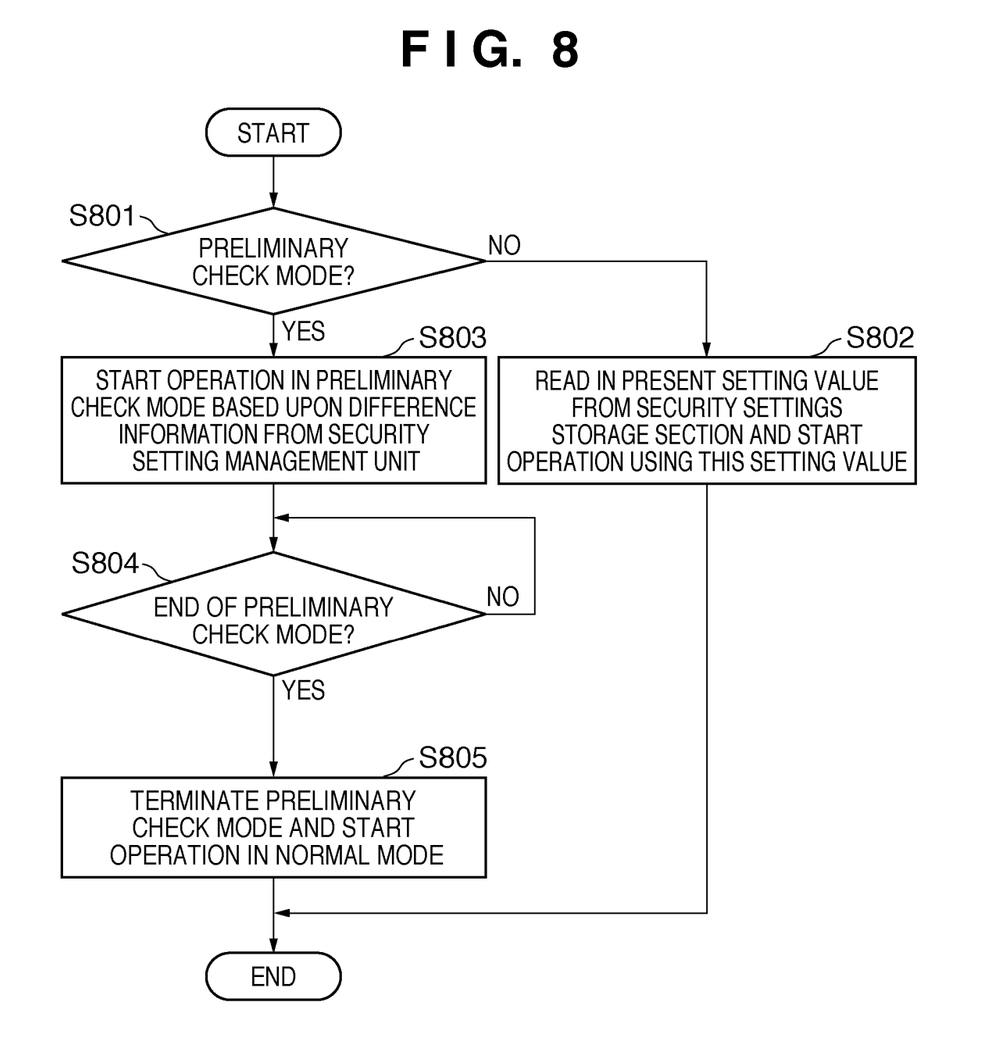
FIG. 8 is a diagram illustrating the details of processing executed by an operation function unit 32.

When a command is input from the security setting management unit 31 to the operation function unit 32, the latter begins the following processing: First, the operation function unit 32 determines whether the command sent from the security setting management unit 31 is one indicating that processing in the preliminary check mode is to be started (S801). If the command indicates that processing is to be started in the normal mode and not the preliminary check mode, the operation function unit 32 reads in "PRESENT SETTING VALUE" from the security settings storage section 33 and starts operates using this setting (S802).

On the other hand, if the command indicates that processing is to be started in the preliminary check mode, then the operation function unit 32 starts operation in the preliminary check mode based upon difference information received from the security setting management unit 31 (S803). If, during execution in the preliminary check mode, operation is performed using a setting after it has been changed, the operation function unit 32 determines whether an event indicative of different behavior will occur. If it is determined that such an event will occur, the operation function unit 32 records this in the log storage section 34. Log recording processing will be described later with reference to FIG. 9.

The operation function unit 32 then determines whether notification that the preliminary check mode has ended has been received from the security setting management unit 31 (S804). If notification of end of the preliminary check mode has not been received, then the operation function unit 32 waits until such notification is received. On the other hand, if the operation function unit 32 is notified of end of the preliminary check mode, then the operation function unit 32 terminates the preliminary check mode and starts operation in the normal mode (S805).

Figure 9:
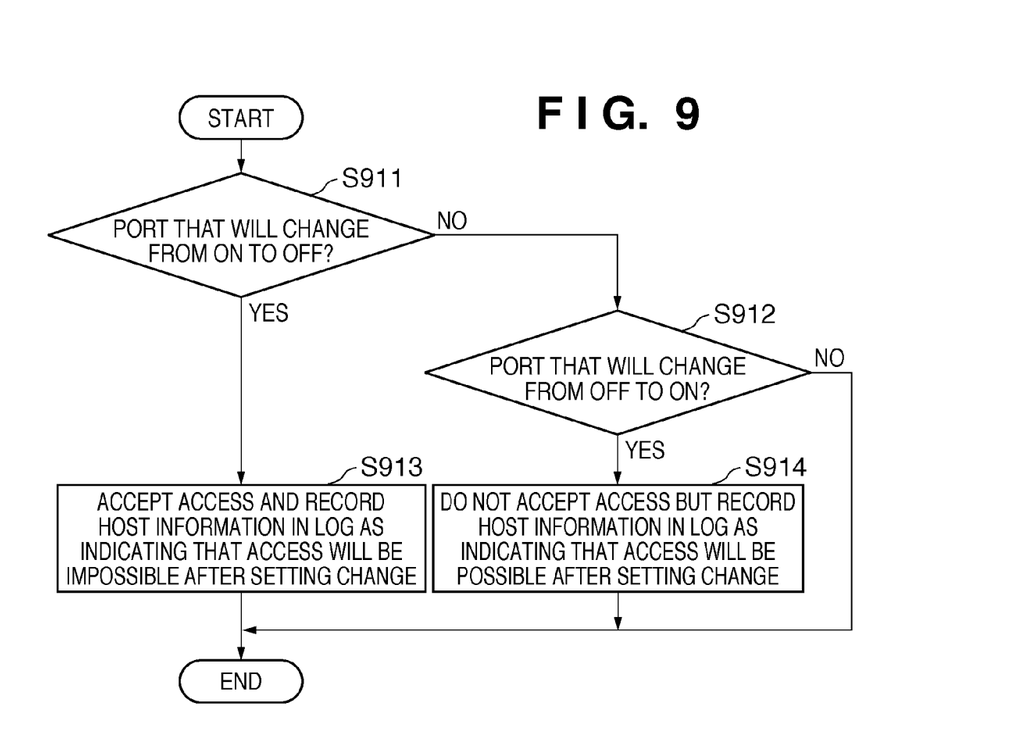
FIG. 9 is a diagram illustrating processing at the time of a preliminary check mode in the operation function unit 32.

Next, reference will be had to FIG. 9 to describe the details of log recording processing executed in the preliminary check mode by the operation function unit 32. The operation function unit 32 starts the processing below when it is accessed from another device (host 2 or 3) connected to the network 4.

On the basis of difference information received from the security setting management unit 31 at S803, the operation function unit 32 determines whether the port that has been accessed is a port that will change from ON to OFF by changing the security setting (S911). That is, the operation function unit 32 determines whether an access restriction will be imposed upon the accessed port following the change in security level. In the case of a port that changes from ON to OFF, the operation function unit 32 will accept access to this port but records host information concerning the host that accessed the port in the log storage section 34 as a log entry indicating that access will be impossible after the change in setting. For example, the operation function unit 32 records the fact that access will be restricted after the change in setting, this being recorded in association with the IP addresses of hosts 2, 3, which are the source of access, on the network.

On the other hand, if the port is not one that will change from ON to OFF, then the operation function unit 32 determines whether it is a port that will change from OFF to ON (S912). If the port is not one that will change from ON to OFF, the operation function unit 32 determines whether it is a port that will change from OFF to ON (S912). If the port is not one that will change from OFF to ON, no change in port ON/OFF occurs (that is, the port is one for which there is no difference in setting) and therefore the operation function unit 32 terminates processing without making a recording in the log. On the other hand, if the port is one that will change from OFF to ON, then the operation function unit 32 will not accept access but records the host information in the log storage section 34 as a log entry indicating that access will be acceptable after the change in setting (S914).

For example, in a case where there is a difference indicated by difference information in the upper half of FIG. 10, the operation function unit 32 records host information of the host that accessed Port. No. 5 in the log storage section 34 at S5913. Further, the security setting management unit 31 acquires the log held in the log storage section 34 and outputs the acquired log to the UI unit 30, whereby the UI unit 30 displays the screen 64 indicating the result of the preliminary check in the preliminary check mode (S509, S510 in FIG. 5).

Thus, in accordance with this embodiment, as described above, it is possible to provide an information processing apparatus, as well as a method of controlling the apparatus, in which it is possible for a user to select whether or not to change a security setting after first recognizing what the effects of the change will be.

In the foregoing embodiment, an ON/OFF setting of a network port is described as an example of a security setting. However, if the setting is one for which operation will become different owing to a setting change, the invention can be applied in a similar manner. For example, in a case where length of a password is less than a prescribed number of characters (five characters, for example) owing to a change in setting, access becomes impossible. In this case, if the information processing apparatus 1 is operated in the preliminary check mode, access will be possible even though the password length is less than five characters. What is recorded in the log, however, is that access will not be acceptable after the setting is changed. It should be noted that it is assumed here that the password is one used as authentication information for logging into the information processing apparatus 1, by way of example. In this way the user can ascertain beforehand that access will be denied after the change in setting and the necessary measures can be taken, such as cautioning the accessing user or issuing a request for remedial action.

In the foregoing embodiment, the preliminary check mode ends upon waiting for a terminate request from the user. However, it may be so arranged that the preliminary check mode ends automatically upon elapse of a predetermined period of time. In such case it will suffice to arrange it so that the security setting management unit 31 waits for elapse of a predetermined period of time rather than for notification of "PRELIMINARY CHECK TERMINATE" from the UI unit 30 at S707 in FIG. 7.

Further, in the foregoing embodiment, the result of operation in the preliminary check mode is displayed on the panel 11. However, an arrangement may be adopted in which the administrator is notified of the result by email. In such case it will suffice to arrange it so that the software arrangement of the information processing apparatus 1 shown in the upper half of FIG. 3 is additionally provided with a mail notification function unit 35 (see the lower half of FIG. 3) and a log is output from the security setting management unit 31 to the mail notification function unit 35 at S510 in FIG. 5.

Further, in the foregoing embodiment, the arrangement is such that after the preliminary check ends, the acquired log is output to the UI unit 30 and the security setting is changed in accordance with a command from the user as to whether the change in security setting is to be performed or not. However, in a case where a log of result of a preliminary check has not been recorded, the security setting may be changed without waiting for a command from the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-263346, filed Nov. 18, 2009 and No. 2009-282225, filed Dec. 11, 2009, which are hereby incorporated by reference herein in their entirety.

What is claimed is:

1. An information processing apparatus comprising:
a central processing unit configured to function as:
a setting unit that selects a security-related setting based upon a command from a user to change a security-related setting;
a determination unit that determines at least one network port to be closed, based on the security-related setting selected by the setting unit;
a recording unit that starts monitoring of the at least one network port to be closed in response to the command from the user to change a security-related setting, while the security-related setting selected by the setting unit is not applied and the network port to be closed remains open, so as to record information concerning an external device that has accessed the network port to be closed; and
a notification unit that provides notification of the information recorded by said recording unit,
wherein said setting unit determines whether to apply the security-related setting selected by the setting unit, and
said setting unit applies, after said notification unit provides notification of the information recorded by the recording unit, the security-related setting selected by the setting unit so as to close the network port to be closed in response to the determination to apply the security-related setting selected by the setting unit.

2. The apparatus according to claim 1, wherein said setting unit determines whether to apply the security-related setting selected by the setting unit based on a command from a user.

3. The apparatus according to claim 1, wherein the command from the user is for changing an already-set security level, from among a plurality of security levels, to a different security level.

4. The apparatus according to claim 1, wherein said setting unit applies the security-related setting in accordance with the command from the user when no external devices have accessed the network port determined by said determination unit.

5. The apparatus according to claim 1, wherein said setting unit determines whether said recording unit recorded the information concerning an external device that has accessed the network port to be closed while the apparatus is in a preliminary check mode, and automatically applies the security-related setting selected by the setting unit in response to determining that said recording unit did not record the information concerning an external device that has accessed the network port to be closed.

6. The apparatus according to claim 1, wherein said setting unit determines whether said recording unit recorded the information concerning an external device that has accessed the network port to be closed within a predetermined time period from reception of the command from the user, and automatically applies the selected security-related setting in response to determining that said recording unit did not record the information concerning an external device that has accessed the network port to be closed.

7. A method of setting security of an information processing apparatus, comprising the steps of:
   selecting a security-related setting based upon a command from a user to change a security-related setting;
   determining at least one network port to be closed based on the security-related setting selected in said setting step;
   monitoring by the information processing apparatus the at least one network port to be closed in response to the command from the user to change a security-related setting, while the security-related setting selected in the setting step is not applied and the network port to be closed remains open, so as to record information concerning an external device that has accessed the network port to be closed
   providing notification of the information recorded in said recording step;
   determining whether to apply the security-related setting selected in the setting step; and
   applying, after providing the notification of the information recorded in said recording step, the security-related setting selected in the setting step so as to close the network port to be closed in response to the determination to apply the security-related setting selected in the setting step.

8. A non-transitory computer-readable recording medium storing a program for causing a computer to perform the steps of:
   selecting a security-related setting based upon a command from a user to change a security-related setting;
   determining at least one network port to be closed based on the security-related setting selected in said selecting step;
   monitoring the at least one network port to be closed in response to the command from the user to change a security-related setting, while the security-related setting selected in the selecting step is not applied and the network port to be closed remains open, so as to record information concerning an external device that has accessed the network port to be closed;
   providing notification of the information recorded in said recording step;
   determining whether to apply the security-related setting selected in the selecting step; and
   applying, after providing the notification of the information recorded in said recording step, the security-related setting selected in the selecting step so as to close the network port to be closed in response to determining to apply the security-related setting selected in the selecting step.

9. An information processing apparatus comprising:
   a central processing unit configured to function as:
      an accepting unit that accepts a command from a user to change a security-related setting;
      a setting unit that selects a security-related setting of the information processing apparatus based upon the command accepted by said accepting unit;
      a recording unit that starts monitoring an access from an external device to the information processing apparatus in response to the command from the user to change a security-related setting, so as to record an access log of an access from an external device to the information processing apparatus while the security-related setting selected by the setting unit is not applied, wherein the access log includes at least one of:
         (i) an access log of an access from an external device to the information processing apparatus that is not accepted based upon a current security-related setting before applying the security-related setting selected by the setting unit and will be accepted based upon the security-related setting selected by the setting unit; and
         (ii) an access log of an access from an external device to the information processing apparatus that is accepted based upon the current security-related setting before applying the security-related setting selected by the setting unit and will not be accepted based upon the security-related setting selected by the setting unit; and
      a notification unit that provides notification of the access from the external device to the user based on the access log record by the recording unit,
      wherein said setting unit determines whether to apply the security-related setting selected by the setting unit, and
      said setting unit applies, after said notification unit provides the notification of the access from the external device to the user based on the access log recorded by the recording unit, the security-related setting selected by the setting unit in response to determining to apply the security-related setting selected by the setting unit.

10. The apparatus according to claim 9, wherein said setting unit determines whether to apply the security-related setting selected by the setting unit based upon a command from a user.

11. The apparatus according to claim 9, wherein the setting unit selects the security-related setting by selecting one of a plurality of security levels.

12. The apparatus according to claim 9, wherein the setting unit applies the security-related setting based upon the command accepted by said accepting unit without waiting for a further command from the user, when the recording unit records no access logs.

13. The apparatus according to claim 9, further comprising a determination unit configured to determine a port number of a network port of the information processing apparatus that changes from a closed state to an open state due to applying the security-related setting,
wherein said recording unit records an access log of an access to the network port that is identified with the port number determined by the determination unit.

14. The apparatus according to claim 13, wherein the setting unit opens the network port based upon the command from the user, after the notification unit provides notification of the access from the external device to the user based on the access log recorded by said recording unit.

15. The apparatus according to claim 9, further comprising a determination unit configured to determine a port number of a network port of the information processing apparatus that changes from an open state to a closed state due to applying the security-related setting,
wherein said recording unit records an access log of an access to the network port that is identified with the port number determined by the determination unit.

16. The apparatus according to claim 15, wherein the setting unit closes the network port based upon the command from the user, after the notification unit notifies the access from the external device to the user based on the access log recorded by said recording unit.

17. The apparatus according to claim 9, wherein said setting unit determines whether said recording unit recorded the access log of the access from the external device to the information processing apparatus while the apparatus is in a preliminary check mode, and automatically applies the security-related setting selected by the setting unit in response to determining that said recording unit did not record the access log of the access from the external device to the information processing apparatus.

18. The apparatus according to claim 9, wherein said setting unit determines whether said recording unit recorded the access log of the access from the external device to the information processing apparatus within a predetermined time period from reception of the command from the user, and automatically applies the selected security-related setting in response to determining that said recording unit did not record the access log of the access from the external device to the information processing apparatus.

19. A method of setting security of an information processing apparatus, comprising the steps of:
accepting a command from a user to change a security-related setting;
selecting a security-related setting of the information processing apparatus based upon the command accepted in said accepting step;
monitoring by the information processing apparatus an access from an external device to the information processing apparatus in response to the command from the user to change a security-related setting, so as to record an access log of an access from an external device to the information processing apparatus while the security-related setting selected in the selecting step is not applied, wherein the access log includes at least one of:
(i) an access log of an access from an external device to the information processing apparatus that is not accepted based upon a current security-related setting before applying the security-related setting selected in the selecting step and will be accepted based upon the security-related setting selected in the selecting step; and
(ii) an access log of an access from an external device to the information processing apparatus that is accepted based upon the current security-related setting before applying the security-related setting selected in the selecting step and will not be accepted based upon the security-related setting selected in the selecting step providing notification of the access from the external device to the user based on the access log recorded in the recording step;
determining whether to apply the security-related setting selected in the selecting step; and
applying, after providing the notification of the access from the external device to the user based on the access log recorded in the recording step, the security-related setting selected in the selecting step in response to determining to apply the security-related setting selected in the selecting step.

20. A non-transitory computer-readable recording medium storing a program for causing a computer to perform the steps of:
accepting a command from a user to change a security-related setting;
selecting a security-related setting of the information processing apparatus based upon the command accepted in said accepting step;
monitoring an access from an external device to the information processing apparatus in response to the command from the user to change a security-related setting, so as to record an access log of an access from an external device to the information processing apparatus while the security-related setting selected in the selecting step is not applied, wherein the access log includes at least one of:
(i) an access log of an access from an external device to the information processing apparatus that is not accepted based upon a current security-related setting before applying the security-related setting selected in the selecting step and will be accepted based upon the security-related setting selected in the selecting step; and
(ii) an access log of an access from an external device to the information processing apparatus that is accepted based upon the current security-related setting before applying the security-related setting selected in the selecting step and will not be accepted based upon the security-related setting selected in the selecting step;
providing notification of the access from the external device to the user based on the access log recorded in the recording step;
determining whether to apply the security-related setting selected in the selecting step; and
applying, after providing the notification of the access from the external device to the user based on the access log recorded in the recording step, the security-related setting selected in the selecting step in response to determining to apply the security-related setting selected in the selecting step.

21. An information processing apparatus comprising:
a central processing unit configured to function as:
an identification unit that identifies, based on an instruction from a user, a network port to be closed;

a recording unit that records information of an external device that has accessed, in a state where the network port identified by the identification unit is not closed, the information processing apparatus through the network port identified by the identification unit;

a display control unit that controls a display unit to display a result recorded by the recording unit; and a closing unit that closes the network port identified by the identification unit, in response to input of an instruction from the user to confirm closing the network port after the display unit displays the result recorded by the recording unit.

22. The information processing apparatus according to claim 21, wherein the identification unit identifies the network port corresponding to a security level indicated by the user.

23. The information processing apparatus according to claim 21, wherein the information processing apparatus further functions as a cancelling unit that cancels the closing of the network port identified by the identification unit in response to input of an instruction from the user to cancel closing the network port after the display unit displays the result recorded by the recording unit.

24. The information processing apparatus according to claim 21, wherein the recording unit starts monitoring the network port identified by the identification unit in response to input of an instruction from the user to perform a preliminary check.

25. The information processing apparatus according to claim 21, wherein the display unit displays an IP address of the external device as the result recorded by the recording unit.

26. The information processing apparatus according to claim 21, wherein the recording unit records information of an external device that has accessed, after the identification unit identifies the network port and before the identified network port is closed, the information processing apparatus through the network port identified by the identification unit.

27. The information processing apparatus according to claim 21, wherein:

the recording unit records information of an external device that has accessed the information processing apparatus through a first network port which is not closed, the first network port being identified to be closed by the identification unit;

the display control unit controls the display unit to display information indicating the external device that has accessed the information processing apparatus through the first network port; and the closing unit closes the first network port such that every access to the information processing apparatus through the first network port is refused while the first network port is closed.

* * * * *